US007647254B2

(12) United States Patent
Cool

(10) Patent No.: US 7,647,254 B2
(45) Date of Patent: *Jan. 12, 2010

(54) METHOD AND SYSTEM FOR PROVIDING CUSTOMIZED COMPUTER SOLUTIONS

(75) Inventor: Kenneth J. Cool, Castle Rock, CO (US)

(73) Assignee: Acer Incorporated (TW)

( * ) Notice: Subject to any disclaimer, the term of this patent is extended or adjusted under 35 U.S.C. 154(b) by 944 days.

This patent is subject to a terminal disclaimer.

(21) Appl. No.: 10/301,422

(22) Filed: Nov. 20, 2002

(65) Prior Publication Data

US 2004/0098314 A1 May 20, 2004

(51) Int. Cl.
*G06F 17/30* (2006.01)
(52) U.S. Cl. .......................................... 705/27; 705/26
(58) Field of Classification Search .................... 705/26, 705/27; 713/100
See application file for complete search history.

(56) References Cited

U.S. PATENT DOCUMENTS

| 4,992,940 | A |   | 2/1991 | Dworkin |
| 5,263,164 | A |   | 11/1993 | Kannady et al. |
| 5,515,524 | A |   | 5/1996 | Lynch et al. |
| 5,668,995 | A |   | 9/1997 | Bhat |
| 5,708,798 | A | * | 1/1998 | Lynch et al. ..................... 703/1 |
| 5,745,765 | A |   | 4/1998 | Paseman |
| 5,745,880 | A |   | 4/1998 | Strothmann |
| 5,787,246 | A |   | 7/1998 | Lichtman et al. |
| 5,963,939 | A | * | 10/1999 | McCann et al. ................. 707/4 |
| 6,059,842 | A |   | 5/2000 | Dumarot et al. |
| 6,096,094 | A |   | 8/2000 | Kay et al. |
| 6,167,383 | A | * | 12/2000 | Henson ........................ 705/26 |
| 6,192,319 | B1 |   | 2/2001 | Simonson et al. |
| 6,192,470 | B1 |   | 2/2001 | Kelley et al. |
| 6,195,643 | B1 |   | 2/2001 | Maxwell |
| 6,711,676 | B1 | * | 3/2004 | Zomaya et al. ............. 713/100 |
| 2001/0001146 | A1 |   | 5/2001 | Petersen |
| 2002/0178075 | A1 | * | 11/2002 | Emerick et al. ............... 705/26 |
| 2003/0212775 | A1 | * | 11/2003 | Steele et al. ................ 709/223 |

OTHER PUBLICATIONS

Lu, Cary; "The Wireless Office," Macworld, Dec. 1994, v11i12pg163, Proquest #53283, 4pgs.*

(Continued)

*Primary Examiner*—Robert M. Pond
(74) *Attorney, Agent, or Firm*—Thomas W. Tolpin; Tolpin & Partners, PC

(57) ABSTRACT

At least one or more customized solutions for setting up a computer system for a customer may be provided. A customer may select a new computer system, or upgrade or set up a current computer system based at least in part on customer identification information. A customer solutions advisor computer program may query the customer and/or may retrieve databases to determine a likely computer configuration, preference, and need of the customer. The customer solutions advisor computer program may launch a polling program on at least one or more of computer systems of the customer to determine the configuration of equipment and software in the computer system. The customer solutions advisor computer program may recommend hardware and/or software solutions to the customer. The customer interactively customizes the computer system. Static or animated graphical representations of the proposed computer system solutions may be used to illustrate installation procedures and other operational characteristics of the computer system solution.

5 Claims, 8 Drawing Sheets

OTHER PUBLICATIONS

Proquest: search date on or before Nov. 19, 2001 4pgs.*
PRN: "Gateway brings affordable and easy-to-use wireless solutions to business clients . . . ." PR Newswire, Nov. 27, 2000, Proquest #64710866, 4pgs.*

Dees, Cynthia; "Local Computer Retailers Detail Trends," Business Chronicle, Jun. 8, 1987, v6i23pg5; Proquest #6245928, 4pgs.*
Dolinar, Lou; "Smart Systems creating a computer network at home," Newsday, Jan. 18, 1994; Proquest #101698510, 4pgs.*

* cited by examiner

METHOD AND SYSTEM FOR PROVIDING CUSTOMIZED COMPUTER SOLUTIONS

FIELD OF THE INVENTION

The present invention relates generally to the field of computer systems, and particularly to using customer information to arrive at customized computer solutions.

BACKGROUND OF THE INVENTION

Customers often have unique needs or desires when making computer purchases and upgrades, or otherwise using computer systems. Cost, availability, and compatibility are typical considerations for the customer. The customer may be faced with a bewildering variety of choices while lacking a clear idea as to what combination of software and hardware is most suitable for his or her needs. Various solutions have been proposed, but none, thus far, have taken a thoroughly comprehensive approach that naturally extrapolates from the customer's current computer arrangement and set up with information already known and available to the computer store, computer company, and the customer computer system purchase database.

Therefore, it would be desirable to provide a method and system to advise a customer of available solutions for setting up his computer system in new ways, in making a purchase of either a new computer system, and finding customized solutions for setting up the new and current computer systems to work together, or to upgrade or otherwise modify or set up a previously existing computer system, including analyzing a database of the customer's current and previous computer systems to extrapolate purchase solutions and other options, and presenting one or more available solutions to the customer.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the various embodiments of the invention, examples of which are illustrated in the accompanying drawings.

In one embodiment of the invention, the invention may relate to a method and system for purchasing a new computer system or purchasing an upgrade to an existing computer system, or otherwise setting up or arranging a currently existing computer system. The method may comprise retrieving at least one database associated with an identified customer. The customer may be identified in at least one or more manners, including by customer identification number, login identification, web browser cookie, and customer inventory software that may identify a customer either by identifying a part number that may be stored in a memory in the computer system or by a unique combination of computer system components. The method may generate likely configurations for the customer, and advise the customer accordingly. The customer may then select a new configuration or modify a currently existing configuration. The customer may be asked to provide, among other things, probable and potential uses of the computer system, a budget, desired features and capabilities, and even weighting factors for various desired capabilities to further customize the purchase. Configuration information may also be acquired through having the customer download a polling program that identifies the current capabilities and current set up of the customer computer system. A customer may choose a subsystem with a system for modification.

Figure 1:
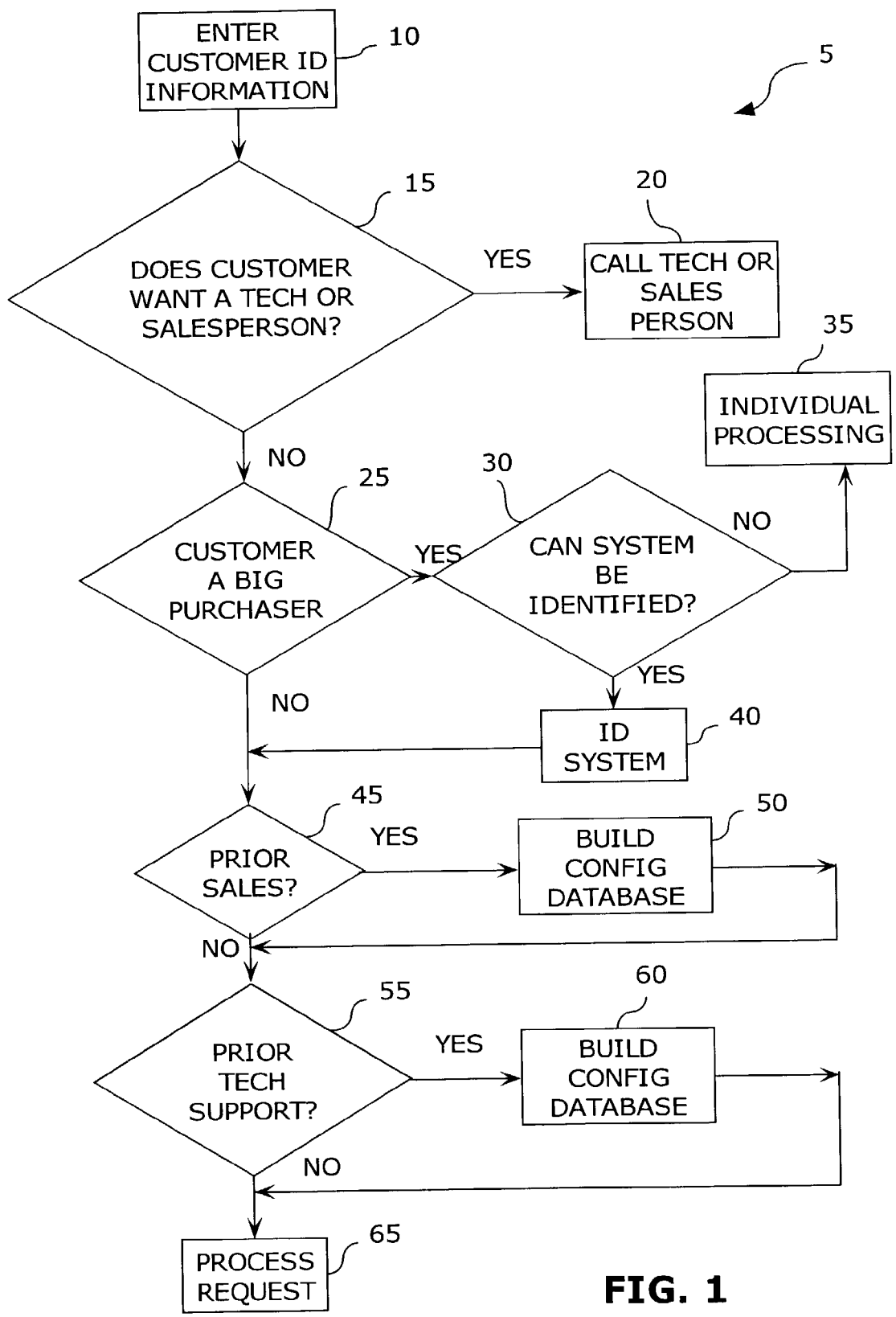
FIG. 1 illustrates an embodiment of the method of the present invention especially for use by a customer within a store.

FIG. 1 shows one embodiment of the present invention. The method may be implemented as a customer solutions provider computer program, but may alternatively be practiced, at least in part, by a sales person or technical support personnel. Unique customer identification information may be entered 10 on a secured web page or display screen from the customer's home, at a computer store location, or at a suitable terminal, including a hand held device or thin client device. The information may be a name, a home address, a work address, the customer's social security number, a device serial number, a product identification number, a sales invoice number, or any unique or quasi-unique identifier. The customer may be asked to verify certain information where the identification information may apply to multiple customers. Past residential and business addresses may also be corroborated by the customer solutions provider computer program to determine data that pertain to former addresses associated with the customer identification information. The customer may elect to deal directly with a salesperson or technical support personnel 15, 20 at any point during the transaction. The customer solutions provider computer program may even allow the customer to specify a particular salesperson or technical support person for guidance. If, for example, the customer is a large purchaser 25, such as the federal government or a large company, further inquiry may be made 30 so as to identify a particular system or subsystem 40 to be purchased or modified. The program may be adapted to accept federal government contract information to aid the federal agency in tracking purchases. If the system or subsystem cannot be identified, the customer may be prompted for more information or may be referred to a salesperson or technical support personnel 35. If the system is identified or if the customer is not a large purchaser, one or more databases may be accessed to provide a customized solution. Any prior sales data 45 associated with an identifiable system or small purchase customer may be incorporated into a database 50 for the transaction. Likewise, any prior technical support assistance 55 associated with an identifiable system or small purchase customer may be incorporated into the same or a related database 60 for the transaction. Alternatively, only one of the technical support and prior sales databases may be used. In another embodiment, a different database or other type of database may be used. The information garnered may include open slots, available ports, available hard disk drive space, random access memory (RAM) size, and the like in the customer's current computer system. A relational database management system may be used to relate the database information and provide options to the customer. Then, the customer may be presented 65 with an inquiry as to whether he wants to modify an existing system, purchase an new system, generate a list of options for later consideration, or perform some other activity such as setting up a local or home network.

Alternatively, or in addition, the customer may be presented with a set of questions on the intended use of the system. There may be a longer set of questions for a customer who desires detailed information in making a purchase, or alternatively a shorter set of questions for a customer who may not want to spend much time answering questions. These questions may be presented through a graphical user interface and may include queries about professional and/or lifestyle enhancements. Examples of potential questions include determining if a network card and/or a universal serial bus (USB) port is already present in a computer to be upgraded, if a wireless network is desired, if an Internet connection needs to be shared, and if there is already a printer to include in a network. The graphical user interface may present the questions as boxes to be marked off by the user. The graphical user interface may allow natural language entries of information to determine the customer's current configuration of hardware and software and the customer's desired configuration. The databases and the customer input may be used to provide options for purchase to the customer to arrive at a customized computer solution.

Figure 2:
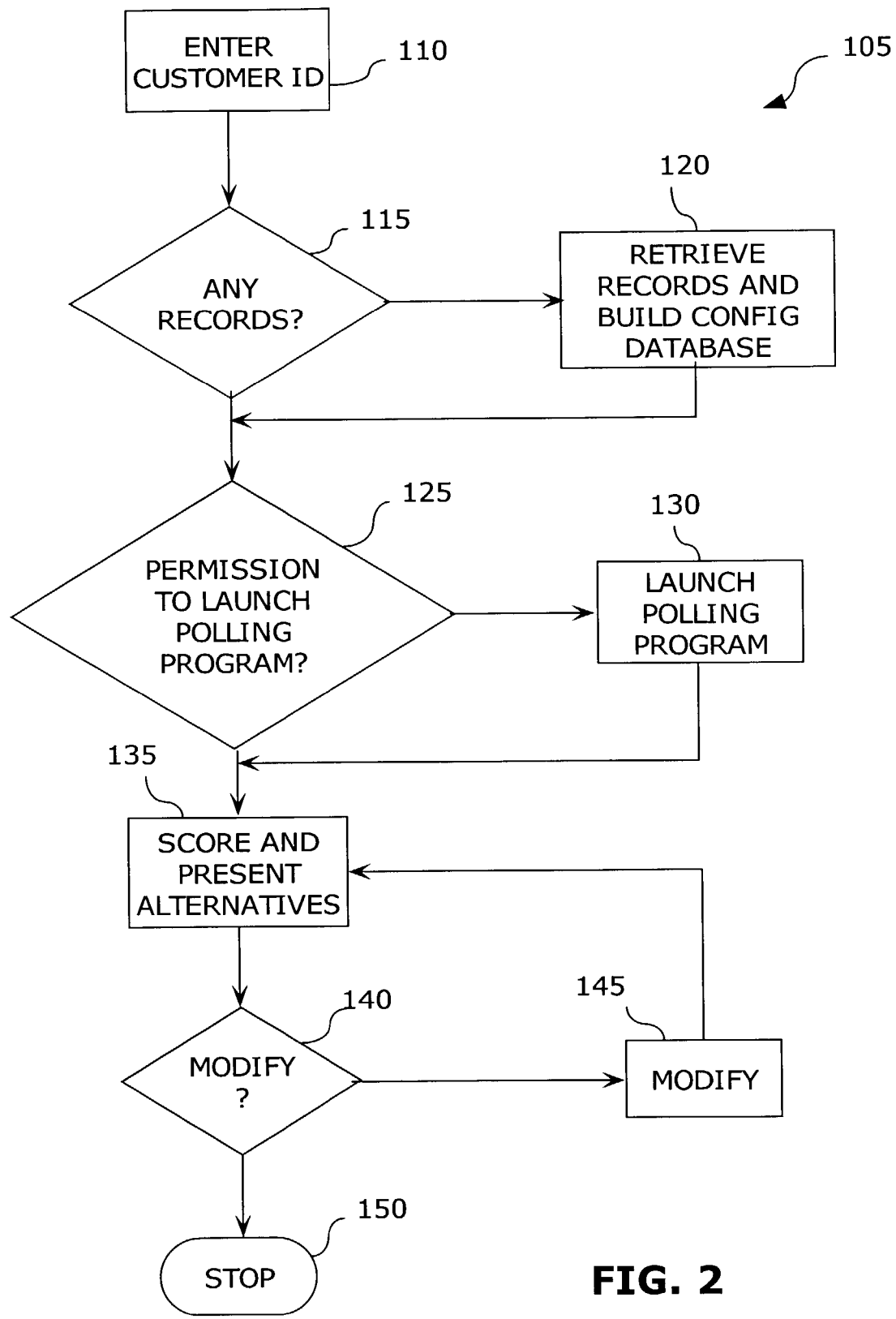
FIG. 2 illustrates an alternative embodiment of the method of the present invention that may be actuated from a remote location.

FIG. 2 shows an alternative embodiment of the present invention. After the customer enters the identification information 110, a determination may be made whether there are any records of past transactions 115. If there are records of past transactions, then those records may be retrieved and entered into a database 120. If the customer is communicating through a computer system that is to be modified, the customer may be asked for permission to download a polling program onto the customer's computer 125. The polling program may be a subroutine or code of the customer solutions provide computer program or may be a separate computer program. With the permission granted, the polling program may record the present configuration of the customer computer system 130. The customer solutions provider computer program may use the configuration information and the databases to score and present alternative customized computer solutions to the customer 135. The customer may then be asked to select a recommended option 140. For example, if the customer's computer has an open peripheral component interface (PCI) slot, the customer may be advised to buy a PCI home phoneline network alliance (HPNA) card. If the customer's computer only has a USB port available, the customer may be advised to buy a USB-HPNA adapter. The customer may also be advised to buy cables, software, firewall software, and the like to complete the solution. By selecting an option or otherwise entering a response, the system configuration may be modified 145 according to the recommended or select solution. When the customer indicates satisfaction with the recommended and/or selected components for purchase, the processing may stop 150 and an order may be submitted.

In an example of the utility of the method, the customer has a desktop personal computer (PC) with universal serial bus ports but no networking card. The customer now seeks to network a laptop to the desktop PC. The customer may access a computer store's customer assistant computer systems solutions advisor computer program by logging into a computer store or home computer using the customer identification information. The program may use the databases of prior purchases and technical support to provide one or more customized computer solutions. The program may also query the customer about the customer's desktop PC or launch a polling program onto the customer's desktop PC to determine the configuration. For example, the polling program may determine that the desktop PC lacks an Ethernet card, but has USB ports and an open PCI slot. The customer solutions provider computer program may have the capability to recognize that the presence of USB ports facilitates incorporation of USB devices. Likewise, if the desktop computer does not have an open PCI slot because all PCI slots were full at the time of purchase, the customer solutions provider computer program may not suggest a solution using a PCI slot unless the polling program determines the actual desktop PC configuration has an open PCI slot, for example if one or more PCI cards have been removed after purchase, thereby making one or more PCI slots open and available for use. As an illustration, the method may propose a set of solutions, such as the four solutions presented below:

1) Direct USB-to-USB connection. The customer solutions provider computer program recommends that the customer purchase a laptop computer with a built-in USB, a crossover USB cable, and USB network software.
2) Basic Home Networking Connection. The customer solutions provider computer program recommends that the customer purchase a laptop computer and two USB-to-HPNA adapters or one USB adapter and one PCI HPNA card, wherein USB cables, telephone cables, and software are already included with the adapters.
3) Advanced Home Networking Connection. The customer solutions provider computer program recommends that the customer purchase the components of solution 2 plus an HPNA/Ethernet router (for future network expansion).
4) Wireless Fidelity (WiFi) Connection. The customer solutions provider computer program recommends that the customer purchase a laptop computer (with WiFi card), a PCI WiFi card for the personal computer, and a WiFi router or access point.

Figure 3:
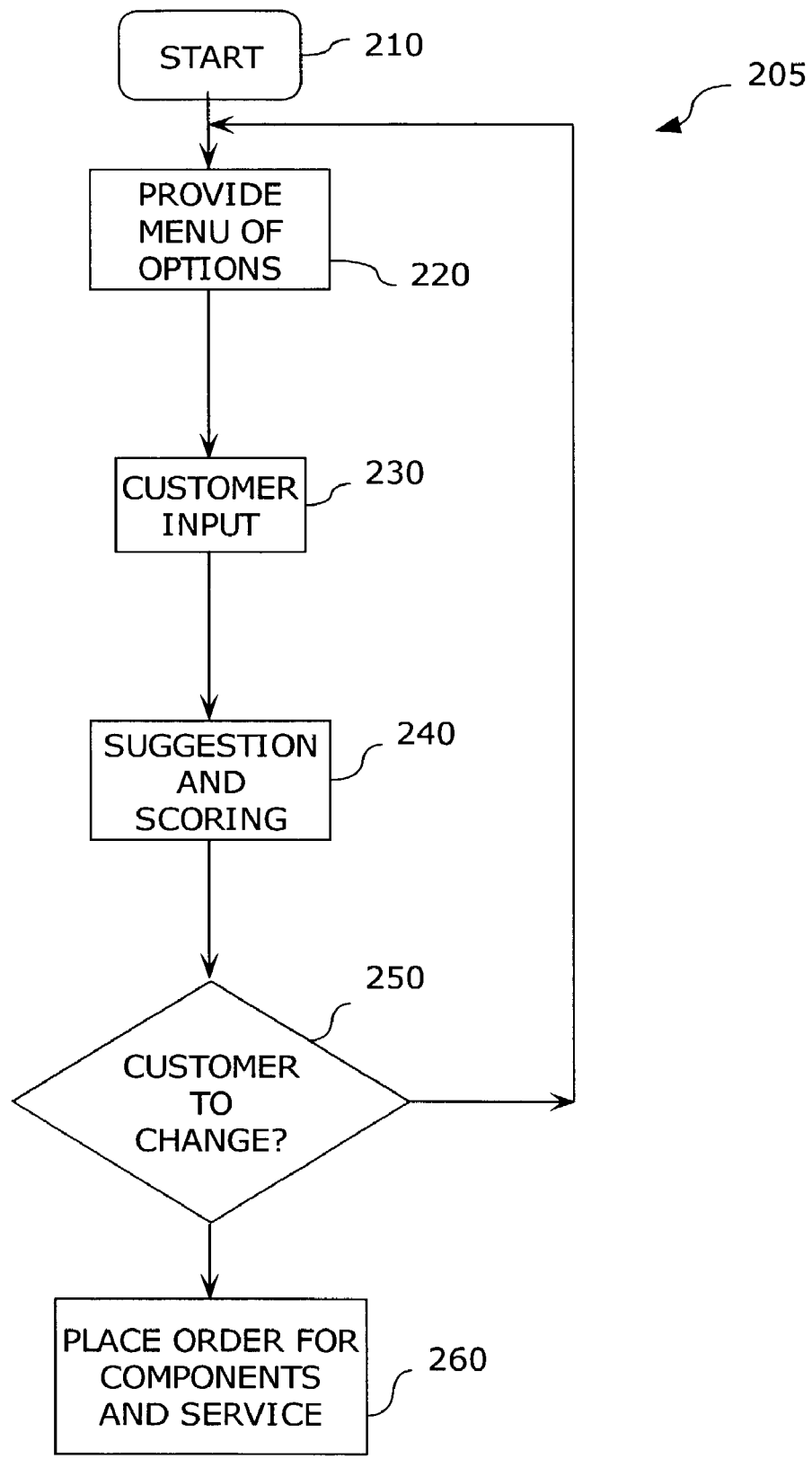
FIG. 3 illustrates one embodiment processing an individual request with one embodiment of the present invention.

FIG. 3 shows one embodiment of the invention including iterative and interactive processing by the customer solutions provider computer program using customer input. From a menu of options 220, the customer may make one or more selections 230. In response, options may be presented to the customer 240 through a table, a menu, an icon, or the like. The options may be scored through a relevance determination algorithm that the user may be able to modify by weighting factors. For example, the user may indicate a strong preference for a particular kind of processing and a mild preference for another kind of processing. Based on the database for the customer and optionally on databases reflecting customer comments and manufacturer's information, the relevance determination algorithm may fine-tune the options presented. If the customer elects to change the parameters of selection 250, processing may return to step 220; otherwise, the customer may place an order for the components and/or service 260.

Figure 4:
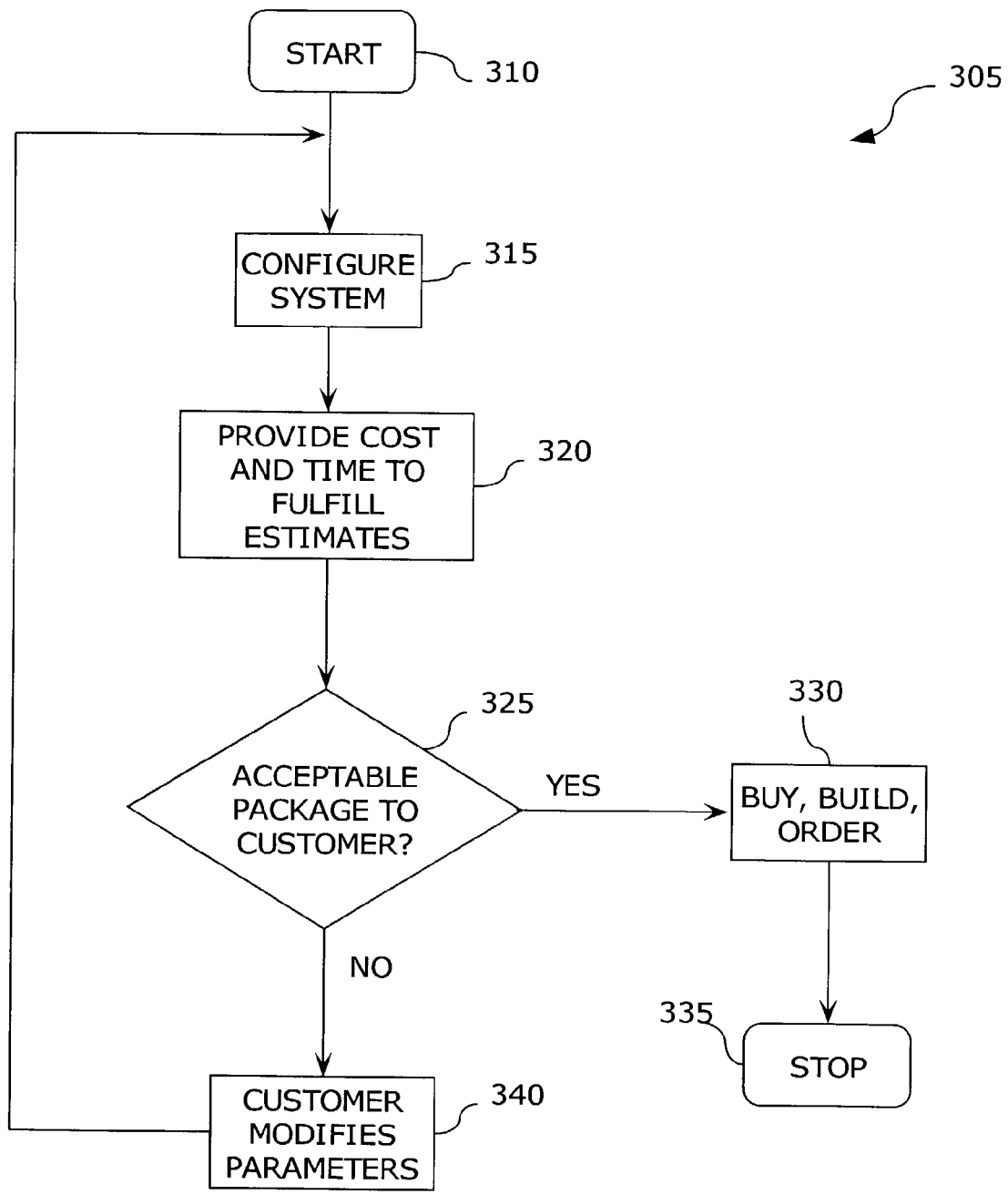
FIG. 4 illustrates one embodiment for providing a suitable delivery schedule to a potential customer with one embodiment of the present invention.

FIG. 4 shows delivery schedule satisfaction processing 305 of the customer solutions provider computer program in accordance with one embodiment of the invention. A proposed configuration may be presented 315 to the user. An estimate of the cost and delivery time may be presented for the various components and services to realize the upgrade or otherwise set up the system. Unique or customized solution packages with special pricing may be included. The solution may include remanufactured or refurbished components. If the customer is satisfied with the cost and installation schedule, the customer may then request that the components and services be purchased and/or ordered and the system built or upgrade installed 330, or alternatively desired components, devices or software may be purchased. Otherwise, the customer may select alternative components or services 340 to determine another estimate of cost and delivery time. The customer solutions provider computer program may also present shipping costs to the customer for his consideration.

Figure 5:
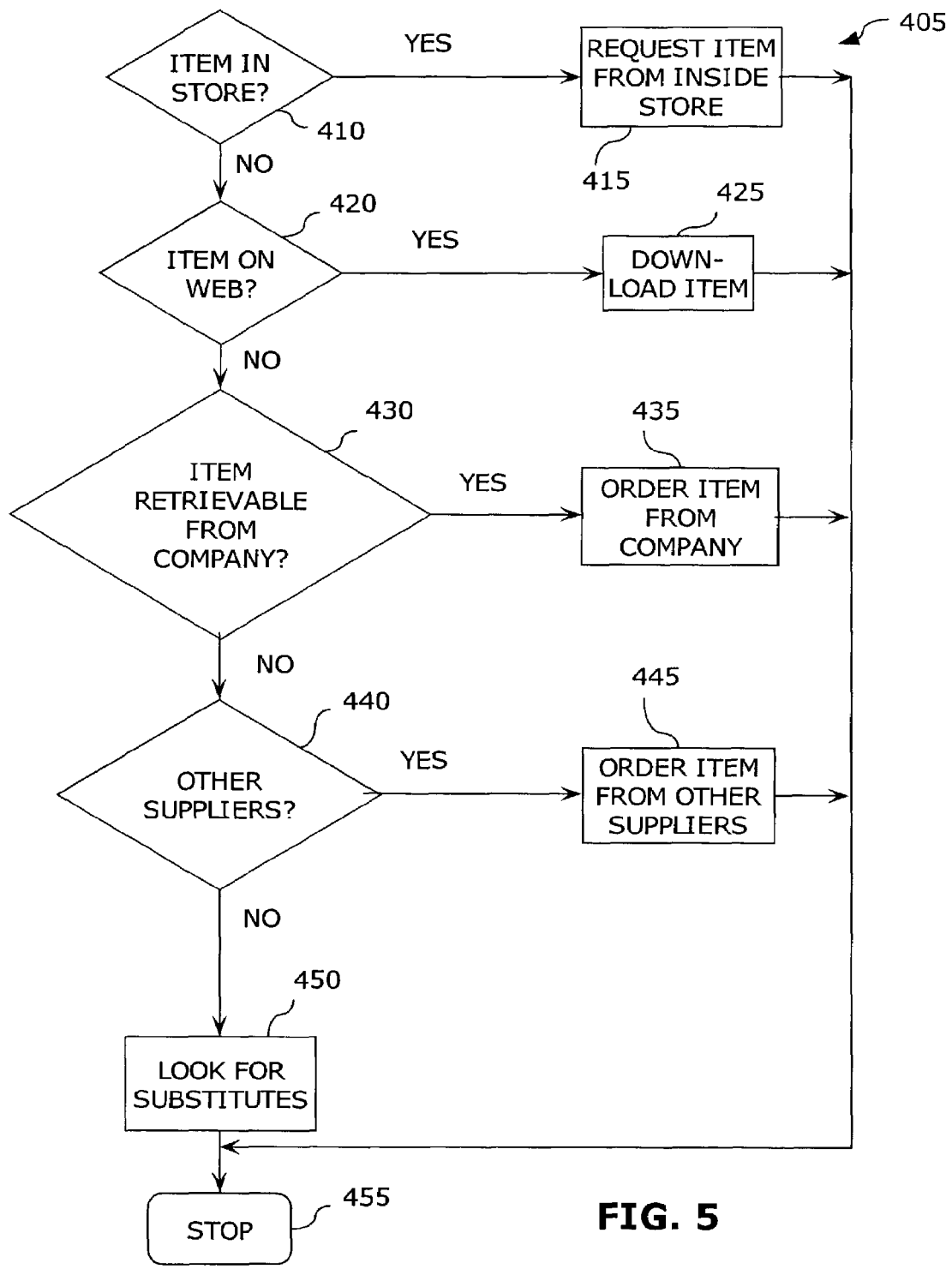
FIG. 5 illustrates one embodiment of the acquisition of components for setting up, upgrading, or building a computer system in accordance with one embodiment of the present invention.

FIG. 5 shows processing by the customer solutions provider computer program that may be involved in acquiring the desired components for the new computer system or the computer system upgrade in accordance with one embodiment of the invention. If the item is in the store 410, the item may be immediately purchased 415. If the item is downloadable through a website or the Internet 420, the customer may pay for the service, if a cost is associated therewith, through a secure channel and then download directly 425. If the item is not located in the store, a determination may be made whether it may be ordered from the manufacturing plant, another store, a warehouse, or the like 430. If the item is available through the company, or through a partner or affiliate company, the item may then be ordered 435. Other companies may offer compatible substitutes. If the item is unavailable in the company store, an inquiry may be made for equivalents from other suppliers 440. If the item is readily available through another supplier, it may then be ordered 445. Otherwise, company personnel may initiate a search for substitutes 450.

The customer solutions provider computer program may incorporate various sets of instructions that are interrelated to perform various tasks. There may be a set of instructions for the identification of a customer. Other sets of instructions may perform various tasks such as the retrieval of a database, the launch and control of a polling program to identify a customer's computer system configuration, querying a customer for needs and preferences, providing a weighting system for scoring the options to be present to a customer, the presentation of static or dynamic graphical information to a customer to illustrate installation steps and operational features of a computer system, the recommendation options, providing pricing and delivery estimates, downloading software over the web, ordering components, running a verification of an installation or an upgrade, running inventory software, and the like. The sets of instructions may be integrated into a single computer program that may reside on a customer computer in a store or on a store server. Alternatively, the customer solutions provider computer program may be distributed over two or more computers.

Figure 6:
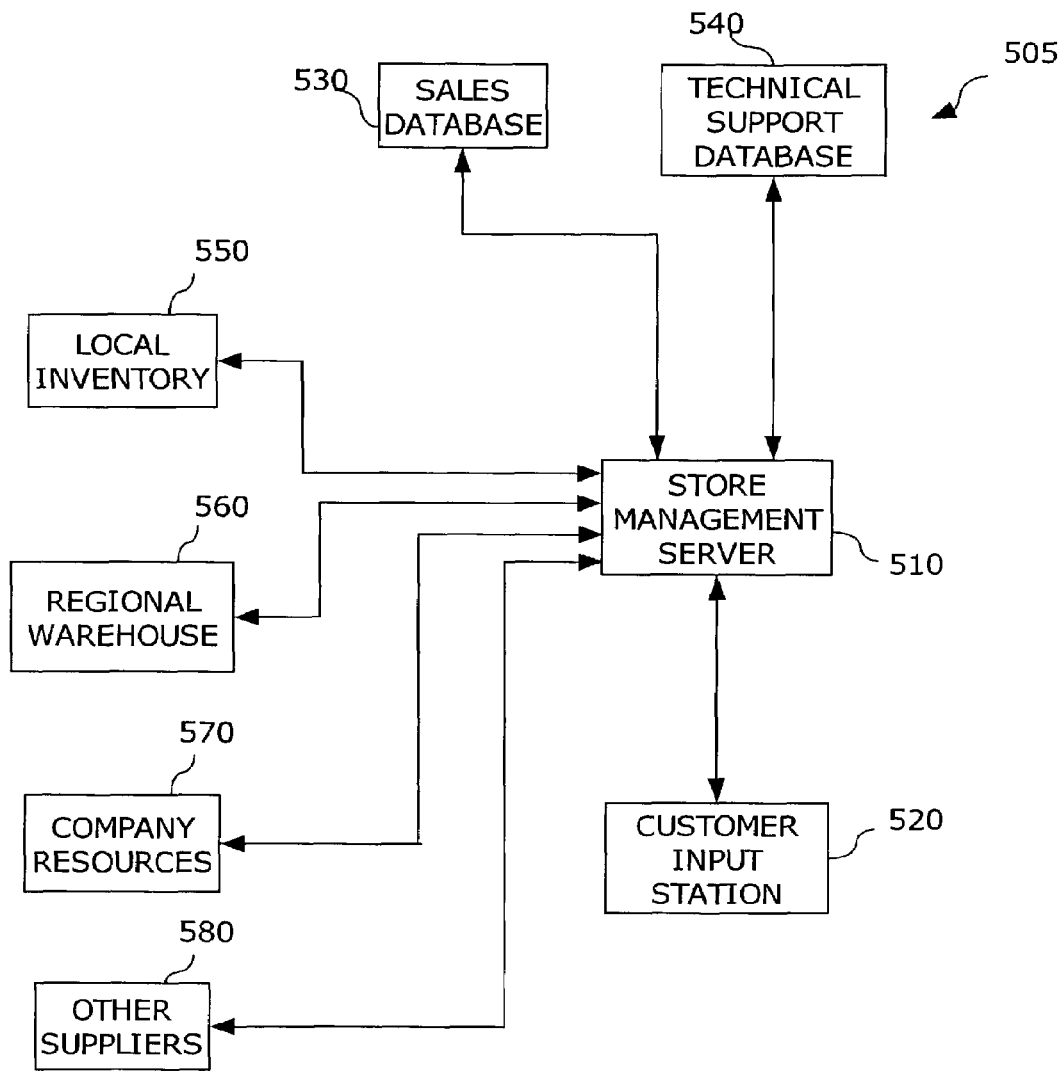
FIG. 6 illustrates an embodiment of a system of the present invention.

FIG. 6 shows one embodiment of a system of the present invention. A customer may input identification and other information through a customer computer 520. The customer computer 520 may be at the customer's work site, the customer's home, or the computer company store, for example. A store database management computer 510 may receive the information from the customer and accesses databases, such as a sales database 530 or a technical support database 540, to aid in the selection process for the customer. Component inventory databases 550, 560, 570, and 580 may be queried from the store database management computer 510 to determine a timeline for the upgrade or installation of the purchased components, or other setting up of the computer. The local inventory database 550 may be an accessory store database.

Figure 7:
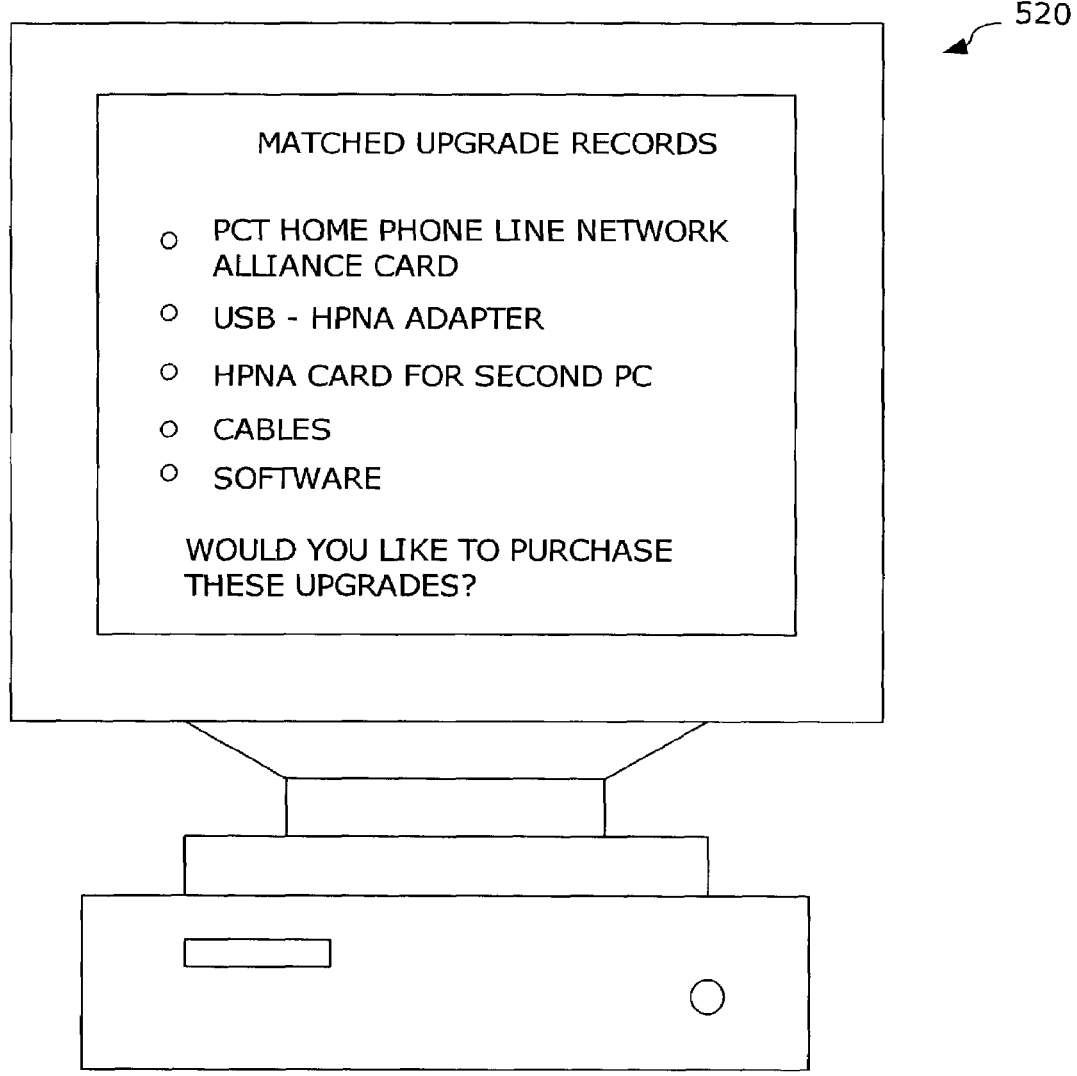
FIG. 7 illustrates an example screen for customer fulfillment with one embodiment of the present invention.

FIG. 7 shows a screen for the purchase of components recommended to the customer in accordance with one embodiment of the invention. The method of the present invention may be practiced through a set of menus, icons, or the like. The customer may check boxes to select options to be added to a virtual shopping cart. The customer solutions provider computer program may check the purchases for consistency with information retrieved about or input by the customer. Discrepancies may be flagged for the customer to take corrective action, as needed or desired.

Figure 8:
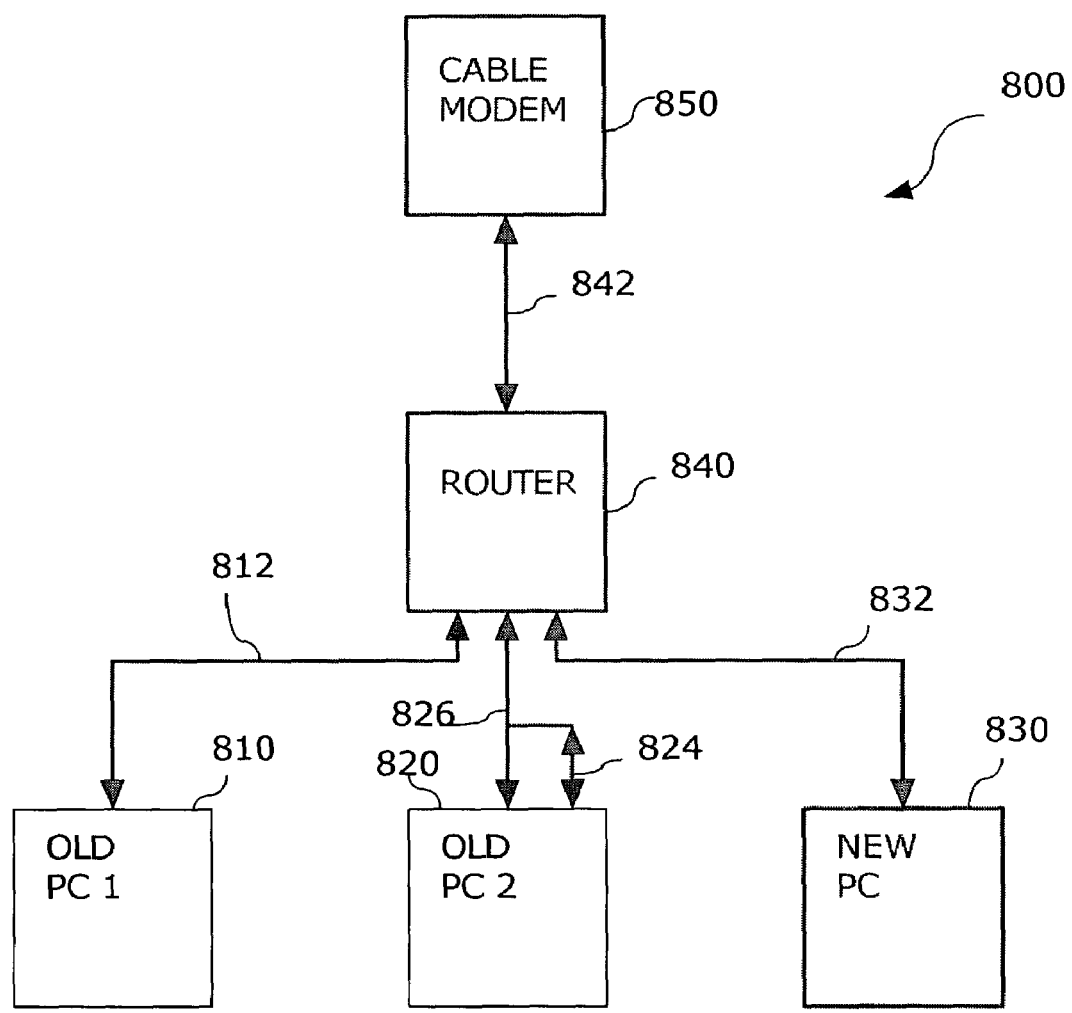
FIG. 8 illustrates an exemplary use of the present invention.

FIG. 8 illustrates an exemplary use of the present invention. A customer may enter or contact a computer equipment store. Previous sales and/or service data may be retrieved according to the customer identification information. For example, the retrieval of this data may identify a first computer 810. The customer may then be provided a screen in which a second computer 820. The second computer may have been purchased elsewhere, by another, or before the accessibility date of current logs. The customer may then indicate an intended use through a menu display or through a natural language entry. For instance, the customer may type in "I want to network these computers and buy another computer" at a home, business, or store terminal. Based on the total information available, by customer input and prior purchase and service activity, various alternatives may be presented to the customer. For example, the customer may be presented with a list of suggested items or services to purchase, such a computer 830, a router 840, a cable modem 850, network interface cards, cables (826, 824, 832, 812, 842), and the like. The customer may be presented with realistic graphical images of the suggested system. The system may recognize existing components within the currently owned hardware and software and may request that the customer verify the existence of these or indicate that the customer does not know.

The method of the present invention may provide solutions for larger networks in addition to individual or smaller customers, for example, for a smaller business that desires to increase the number of PCs and to upgrade from Ethernet to a WiFi network. The proposed solutions may be graphically represented on the display to illustrate exactly how each proposed solution would be arranged or otherwise set up (e.g., a pictorial representation of the network, computers, and any needed devices). The graphical representations may be animated to show a customer how to install a card, open a chassis, connect cables, illustrate data flow, and the like.

A variety of business and home customized or generic solutions may be provided to the customer in accordance with the present invention. For example, solutions may be provided for video editing, gaming, photography, video conferencing, database management, data backup, and the like. The method and system of the present invention may be used to suggest purchases for a customer's current computer system and suggest additions, modifications, and deletions of software and hardware to improve compatibility and overall reliability. For example, an obsolete component, such as an older computer, may be identified as being in need of replacement. Once the solution has been presented, the customer may be walked through the installation via a customer assistance program wherein a solutions advisor or technical support representative working for the computer company may control one or more aspects of the customer's computer system, or by a program that may be run from the company web site to verify that the upgrade or installation was properly performed. Difficult upgrades may be flagged in which the customer may be advised of a local certified technician who may assist with or otherwise perform the upgrade or computer system set up. The customer may automatically be notified of upgrades, detected bugs, and similar matters via e-mail or other audible or viewable forms, including Hyper Text Markup Language (HTML) or Extensible Markup Language (XML) displays, for example. The program may request that the customer fill out a satisfaction survey to enable the company to better tailor its product line and solutions to the needs and desires of its customer base. The customer may also report bugs to the company for cataloging and remedy.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method, comprising:
   logging into a computer by a customer;
   receiving a request from a customer for a home networking configuration utilizing a desired combination of a first previously purchased computer system of the customer and a second computer system configuration for the customer;
   downloading a polling program by the computer to the first previously purchased computer system after receiving permission from the customer and electronically determining by the polling program configuration information of the first previously purchased computer system;
   electronically determining the home networking configuration of the combination of the first computer system and one or more optional configurations of the second computer system;
   providing the customer with a scored list of one or more components that provide the desired combination of the first and second computer systems in the home networking configuration, the scored list being based upon the electronically determined configuration of the first computer system and one or more optional configurations of the second computer system; and
   receiving one or more component selections from the scored list by the customer and placing the one or more component selections into an electronic shopping cart, wherein the one or more component selections placed into the electronic shopping cart are checked for consistency based on the polled configuration information of the first computer system.

2. The method of claim 1, wherein the networking configuration is selected from the group consisting of a wired network and a wireless network.

3. The method of claim 1, including electronically sending the polling program over a network to the computer of the customer.

4. A method, comprising:
   logging into a computer by a customer;
   downloading a polling program by the computer to the first previously purchased computer system after receiving permission from the customer and electronically determining by the polling program configuration information of the first previously purchased computer system;
   receiving a request from the customer for a home networking configuration utilizing a desired combination of the first computer system and a second computer system;
   electronically determining the home networking configuration of the combination of the first computer system and one or more optional configurations of the second computer system;
   providing the customer a scored list of one or more component selections that provide the desired combination of the first and second computer systems in the home networking configuration, the scored list being based upon the electronically determined configuration of the first computer system and one or more optional configurations of the second computer system; and
   receiving one or more component selections from the scored list by the customer and placing the one or more component selections into an electronic shopping cart, wherein the one or more component selections placed into the electronic shopping cart are checked for consistency based on the polled configuration information of the first computer system.

5. The method of claim 4, wherein said configuration information electronically determined from the polling program includes the electronic retrieval of a database maintained by a computer store.

* * * * *